United States Patent Office 3,445,296
Patented May 20, 1969

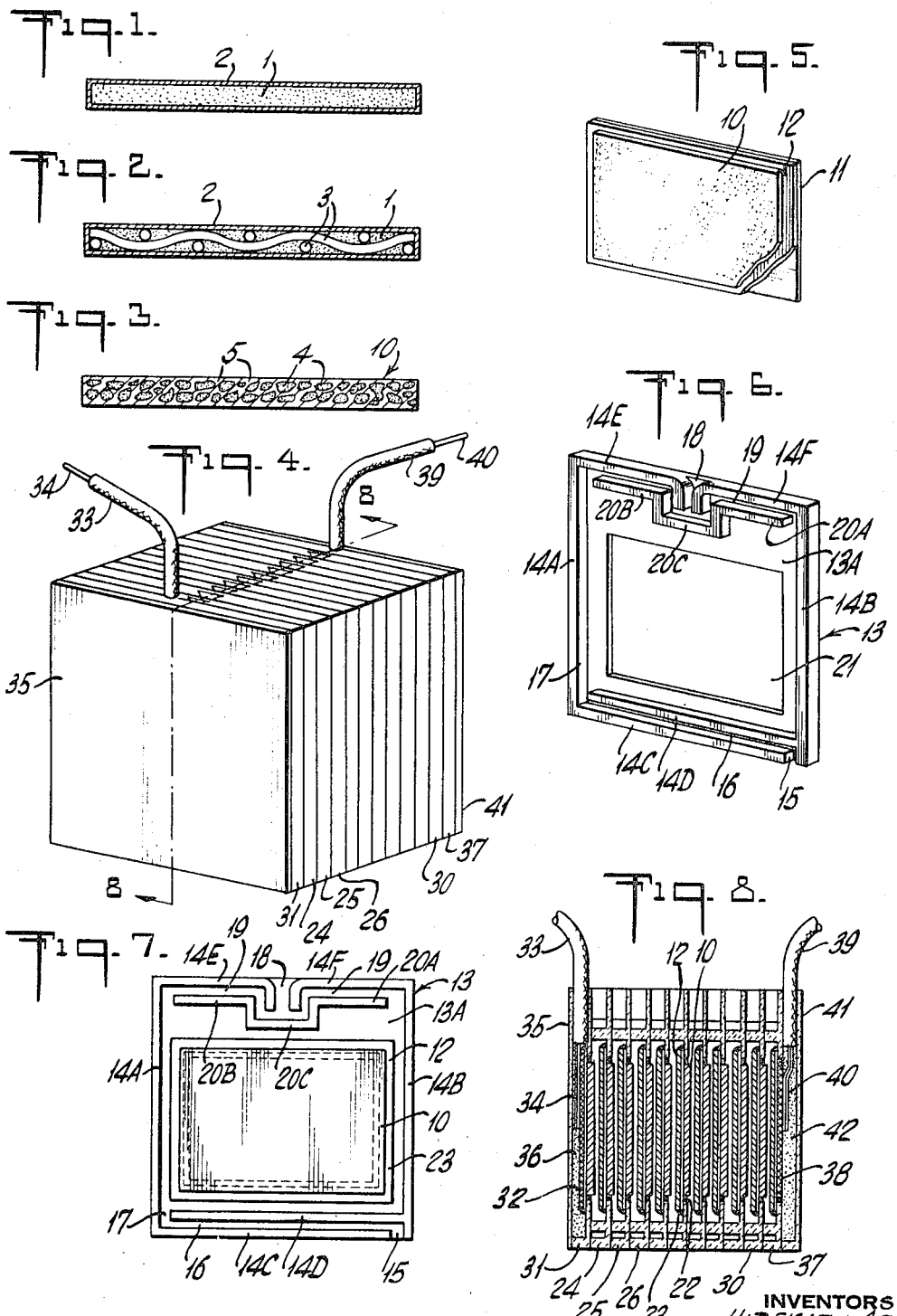

3,445,296
METHOD OF MAKING SILVER CHLORIDE ELECTRODE HAVING A METALLIC SILVER COATING ON AT LEAST PART OF EACH PARTICLE
Hidekazu Abe, Kyoto, Hiromichi Shibata, Hirakata-shi, and Teruo Ito, Kyoto, Japan, assignors to Nihon Denchi Kabushiki Kaisha, Kyoto, Japan, a Japanese company
Filed Mar. 29, 1967, Ser. No. 626,850
Claims priority, application Japan, July 15, 1966, 41/46,402
Int. Cl. H01m *13/08*
U.S. Cl. 136—120                                5 Claims

ABSTRACT OF THE DISCLOSURE

This invention relates to an improved silver chloride electrode and method of making such electrode by treating silver chloride particles to form a metallic silver coating on at least part of each particle and then compressing the powder to form a hardened electrode. By chemically reducing the silver chloride, a porous metallic layer is formed on part or all of the surface of each particle of the powder. The resultant silver chloride electrode has a relatively low internal resistance and thus provides a more efficient battery capable of supplying increased current.

---

This invention relates to electrodes for batteries and more specifically to a novel and improved silver chloride electrode particularly for batteries utilizing sea water or other electrolyte for the generation of electrical energy.

Silver chloride electrodes have heretofore been suggested for use as the cathode electrode of a cell utilizing various kinds of electrolytes and anodes. When silver chloride is used as the active material of a cathode, the silver chloride is reduced to metallic silver during the operation of the battery. Since silver chloride is essentially electrically nonconductive, conductive means must be employed as part of the electrode embodying the silver chloride. The reaction which results in the reduction of silver chloride to metallic silver is a continuous one during the operation of the battery which includes the silver chloride electrode and a suitable conductive base is used with the silver chloride electrode. The silver ions produced during the reaction deposit onto the conductive base and the chlorine ions remain in the solution.

The current and voltage generating efficiency of the cell embodying a silver chloride electrode is a function of the rate of disposition of metallic silver. In practice, when sudden loads at high peak currents are applied to the battery, it is generally necessary that a large area of electrically conductive material be in contact with both the silver chloride and the electrolyte. This invention has as one of its objects the provision of an improved silver chloride electrode which will provide materially higher current densities than prior known electrodes and wherein peak output efficiency can be obtained within a short time after the application of a load.

Another object of the invention resides in the provision of a novel and improved silver chloride electrode for use in batteries that will afford increased battery capacity.

Still another object of the invention resides in a novel and improved method for making silver chloride electrodes for use in batteries.

The above and other objects will become more apparent from the following description and drawings forming part of this application.

In the drawings:

FIGURE 1 is an enlarged cross-sectional view of a conventional silver chloride electrode having a melted silver chloride surface flattened by rolling or other suitable procedure and wherein the surface has been reduced by a reducing solution to provide a porous metal surface layer.

FIGURE 2 is an enlarged cross-sectional view of a modified conventional silver chloride electrode similar to that illustrated in FIGURE 1 but including a silver screen within the body of the electrode.

FIGURE 3 is an enlarged cross-sectional view of a novel and improved silver chloride electrode in accordance with the invention.

FIGURE 4 is a perspective view of one embodiment of a battery utilizing a plurality of silver chloride electrodes in accordance with the invention.

FIGURE 5 is a perspective view of a composite silver chloride electrode in accordance with the invention as used in the battery shown in FIGURE 4.

FIGURE 6 is a perspective view of a supporting frame which is used in connection with the electrode shown in FIGURE 5.

FIGURE 7 is a front elevational view of the supporting structure of FIGURE 6 with the electrode of FIGURE 5 in position therein.

FIGURE 8 is a cross-sectional view of FIGURE 4 taken along the line 8—8 thereof.

As previously discussed, the conventional electrode illustrated in FIGURE 1 includes a silver chloride plate 1 enclosed within a porous silver layer 2. This structure was produced by treating the surface of the silver chloride body 1 with a reducing solution such as a photographic developing liquid and thereby producing the porous silver layer 2. The body 1 was generally formed of melted silver chloride formed in the shape of a plate by rolling or other suitable means. It was then immersed in a 20° C. solution containing about 1.5 gms. of hydroquinone, 0.5 g. of paramethyl aminophenol sulfate, 6 gms. of dehydrated sodium sulfate, and 8.5 gms. of dehydrated sodium carbonate per liter of liquid. The plate was immersed for about four minutes and then washed with water and dried to form the resultant structure.

Another prior procedure for forming a silver chloride electrode involved the utilization of a silver mesh screen anodized by immersion in a solution not exceeding a pH of 6.5 and containing from .1 mol./l. to 1 mol./l. of chlorine ions. The resultant anodized structure was then placed in a reducing solution to form a porous metallic silver layer which was then compressed to provide mechanical strength. Another procedure involved the use of a silver mesh screen embedded in compressed silver chloride powder which was then pressed and reduced by immersion in a reducing solution to form a porous metallic silver layer. FIGURE 2 is a cross-sectional view of such a conventional silver electrode wherein the numeral 3 denotes the silver mesh screen, the numeral 1 silver chloride, and the numeral 2 a porous silver layer.

To form a battery with the prior known silver chloride electrodes, magnesium anodes in the shape of plates were used in combination therewith and immersed in an electrolyte to form a cell. In actual practice, the prior silver chloride electrodes were positioned in spaced relationship with the magnesium electrodes and the opposing surfaces of the silver chloride electrodes carried layers of silver foil which did not react with the silver chloride. Since the porous silver layer 2 on the surface of the silver chloride electrode acts as the conducting means for the generated current, the current must necessarily flow about the periphery of the electrode and accordingly substantial internal battery resistance was introduced. This high resistance is particularly disadvantageous because of the substantial time required to develop energy after immersion in the electrolyte and the serious limitation of the output power of the battery.

The electrode in accordance with the invention is illustrated in FIGURE 3 and provides a materially reduced internal battery impedance. Fabrication of the electrode shown in FIGURE 3 involves the subjection of the silver chloride powder to a reducing agent such as photographic developing liquid and then washing the particles with water and drying them to produce a silver layer on at least part of the surface portion of each particle of silver chloride. These particles are then hardened and formed into the desired shape which in many cases is in the form of a thin plate. One procedure for forming the silver chloride powder into a desired shape is to place it in a mold of a predetermined contour and then compress the reduced silver chloride powder to form an electrode of a desired contour. Another procedure is to form the reduced silver chloride powder into a relatively thick plate and then rolling it to a predetermined thickness. The resultant plate can then be cut to the desired dimensions. It is of course apparent that any other suitable procedure for forming the flat or contoured silver chloride plate in accordance with the invention may be employed.

More specifically and in accordance with the invention, the silver chloride powder is subjected to a reducing solution to form a porous silver layer over part or all of the surface of each particle. The reducing solution is preferably maintained at about 20° C. and includes 1.5 gms. of hydroquinone, 0.5 g. of paramethyl aminophenol sulfate, 6 gms. of dehydrated sodium sulfate, and 8.5 gms. of dehydrated sodium carbonate in a liter of solution. After the silver chloride powder has been immersed in the solution for about four minutes, it is then washed and dried. The resultant partially reduced silver chloride powder is then compressed by the application of pressure of the order to 700 to 1500 kg./cm.$^2$. The resultant compressed powder forms the completed electrode which may either be formed in any predetermined shape or contour. If desired, the silver chloride plate may be formed by pressing the reduced powder and then rolling it to reduce its thickness whereupon it may then be cut into predetermined sizes and shapes.

The extent to which the surface of the powdered silver chloride is reduced may vary in accordance with the purpose of the cells or batteries to be formed. In general it has been found that if about 3 percent to 20 percent of the weight of the powdered silver chloride is reduced, excellent operation will be obtained.

As shown in FIGURE 3, the completed silver chloride electrode in accordance with the invention includes a plurality of silver chloride particles 4, each of which is covered at least in part with a porous reduced silver layer 5. Each reduced silver layer 5 is in tight contact with the corresponding silver layers 5 on adjoining particles. In this way a plurality of conductive paths are formed transversely of the electrode 10. Since the electrode 10 would include a conductive layer on one surface thereof, current generated at the electrode surface during operation of of the cell flows directly through the thickness of the electrode to the conductive element on the rear face thereof. As a result, the internal resistance of the electrode is small and a much improved operating characteristic is obtained as compared with conventional electrodes.

FIGURE 4 shows a battery structure utilizing silver chloride electrodes in accordance with the invention. In this structure a plurality of series connected cells each consisting of a silver chloride electrode and a magnesium electrode. The silver chloride electrode 10 as shown in FIGURE 3 is utilized with a silver layer 12 on one side thereof and a magnesium electrode overlying the silver layer. This structure is shown more clearly in FIGURE 5. In FIGURE 5 it will be observed that the area of the silver chloride layer is slightly smaller than the area of the silver layer 12 and the magnesium layer 11. This arrangement facilitates mounting of the structure shown in FIGURE 5 in the supporting frame 13 shown in FIGURE 6.

Referring now to FIGURE 6, the frame 13 has a plate 13A containing an opening 21 which is only slightly larger than the silver chloride electrode 10 illustrated in FIGURE 5. The plate 13A as well as the other elements of the frame to be described are preferably formed of a synthetic resin that has good insulating characteristics and will not be adversely affected by the electrolyte.

The plate 13A has a surrounding edge consisting of side elements 14A and 14B, lower elements 14C and 14D, and upper elements 14E and 14F. The lower element 14C extends from the edge 14A to a point in spaced relationship with the edge 14B to leave a gap 15 therebetween. The lower element 14D is spaced above the element 14C and extends from the element 14B to a point in spaced relationship with the element 14A. This arrangement provides a channel for the electrolyte which comprises the gap 15, channel 16 between the elements 14C and 14D, and the gap 17.

The upper side of the structure 13 includes elements 14E and 14F. The central portions of these elements extend downwardly as illustrated in FIGURE 6 and provide a gap 18 therebetween. Beneath the elements 14E and 14F is an offset ridge comprising portions 20A, 20C, and 20B. Portions 20A and 20B are spaced below the elements 14F and 14E, and the central offset portion 20C is spaced below the terminating edges of the elements 14E and 14F. In this way a circuitous path is formed for the flow of the electrolyte out of the top portion of the cell through the gap 18.

The electrode structure shown in FIGURE 5 is cemented in the frame 13 shown in FIGURE 6 so that the electrode 10 fits within the opening 21. Suitable bonding agents such as an epoxy resin, high melting point wax or the like is packed between the periphery of the silver electrode 10 and the inner edge of the opening 21 as illustrated more clearly in FIGURE 7. The path for the flow of electrolyte may also be clearly observed in FIGURE 7, which comprises the gap 15, the channel 16 and the gap 17 for admission of the electrolyte at the bottom of the cell and the channels 19 and the gap 18 for discharging the electrolyte at the top of the cell.

In addition to the use of the bonding compound 22 between the electrode 10 and the opening 21, it is also desirable to pack the area between the peripheries of the electrodes 11 and 12 and adjoining surfaces of the frame 13 as indicated at 23.

A plurality of assembled frames as illustrated in FIGURE 7 are utilized in the formation of the batteries as shown in FIGURES 4 and 8. Referring more specifically to FIGURE 8, it will be observed that any number of frames, 24, 25, 26 . . . 30 may be utilized and placed in adjoining relationship as illustrated. The individual cells are bonded one to the other by a suitable synthetic resin serving as a bonding agent. To the left of the cell 24 is a terminating frame 31. This terminating frame has a metal plate 32 which is utilized in place of the magnesium electrode 11 and a lead wire 34 brazed or otherwise secured to the plate 32. The exposed portion of the lead wire 34 has suitable insulation 33. The left side of the terminating frame 31 is closed by an insulating plate 35 bonded to the frame 31 by a suitable bonding agent. The space within the frame 31 is preferably filled with an insulating compound 36. A second terminating frame 37 is placed in overlying relationship with the exposed side of the cell 30, and this frame has a terminal metal plate 38 positioned in place of the silver chloride electrode 10. A wire 40 is brazed or otherwise secured to the plate 38 and the exposed portion of the wire carries suitable insulation 39. An overlying plate of insulated material is bonded to the outer side of the terminal frame 37 and the space formed therebetween is filled with an insulating compound 42. It is of course understood that both the terminal frame 37 and the overlying plate 41 are formed of suitable insulating materials.

The battery as shown in FIGURES 4 and 8 can be preserved as long as desired without deterioration. When it is desired to use the battery, the structure is merely immersed in water, salt water, or other suitable electrolyte, and energy is automatically generated by each silver chloride electrode of one cell and the spaced magnesium electrode of the next adjoining cell. These voltages are added in series, and the total voltage appears between the lead wires 34 and 40. The electrolyte flows into the battery through the gap 15 as previously described and the air originally contained in the interior of the structure is exhausted through the grooves 19 and gaps 18. During the operation of the battery hydrogen is generated at the magnesium electrode and this gas is similarly exhausted through the grooves 19 and the gaps 18. It is also to be observed that the electrolyte used in producing the electromotive reaction between the laminated layers of the battery must flow through circuitous paths entering and leaving the battery. Because of these extended circuitous paths, the electrical resistance is relatively high and leakage currents that may be produced between the spaced cells of the same battery are limited to a relatively low value.

While only one embodiment of the invention has been illustrated and described, it is apparent that alterations, modifications and changes may be made without departing from the true scope and spirit thereof as defined by the appended claims.

What is claimed is:

1. The method of making a silver chloride electrode for a battery comprising the steps of treating particles of silver chloride powder to form metallic silver on at least a portion of the surface of each particle and then compressing the treated powder to form the completed silver chloride electrode.

2. The method of making a silver chloride electrode according to claim 1 wherein a metallic silver surface on each of the particles of silver chloride is formed by chemically reducing at least part of the surface of each of the said particles.

3. The method of making a silver chloride electrode according to claim 1 wherein the silver coated silver chloride particles are placed in a mold of predetermined contour and then compressed to form a rigid electrode.

4. The method of making a silver chloride electrode for a battery according to claim 1 including compressing the silver coated silver chloride powder to form a relatively thick plate, rolling said plate to form a structure of predetermined thickness and then cutting said plate to predetermined dimensions.

5. The method of making a silver chloride electrode for a battery according to claim 1 wherein said silver coated silver chloride powder is rolled under pressure to form a plate of predetermined thickness and said plate is then cut to predetermined dimensions.

References Cited

UNITED STATES PATENTS

| | | | |
|---|---|---|---|
| 2,945,078 | 7/1960 | Chapman et al. | 136—20 |
| 3,005,864 | 10/1961 | Sharpe | 136—100 |
| 3,007,993 | 11/1961 | Haring | 136—100 |
| 3,056,185 | 10/1962 | Langhans | 136—20 XR |
| 3,082,279 | 3/1963 | Andre | 136—34 |
| 3,096,218 | 7/1963 | Lieb et al. | 136—121 |
| 3,279,951 | 10/1966 | Bowers et al. | 136—100 |
| 3,291,709 | 12/1966 | Weininger | 136—100 XR |

WINSTON A. DOUGLAS, *Primary Examiner.*

A. SKAPARS, *Assistant Examiner.*

U.S. Cl. X.R.

75—214; 136—20, 75; 264—61, 111